United States Patent [19]

Sharvit

[11] 4,314,108
[45] Feb. 2, 1982

[54] KEY SET TOLL RESTRICTOR

[75] Inventor: Martin M. Sharvit, Thornhill, Canada

[73] Assignee: Cindon Research Inc., Rexdale, Canada

[21] Appl. No.: 136,735

[22] Filed: Apr. 2, 1980

[51] Int. Cl.³ .............................................. H04M 1/66
[52] U.S. Cl. .............................. 179/90 D; 179/18 DA
[58] Field of Search ........................ 179/18 DA, 90 D

[56] References Cited

U.S. PATENT DOCUMENTS

| | | | |
|---|---|---|---|
| 3,860,763 | 1/1975 | Sudoh et al. | 179/18 DA |
| 3,873,781 | 3/1975 | Nissim | 179/81 R |
| 3,936,617 | 2/1976 | Bolgiano | 179/84 R |
| 4,096,357 | 6/1978 | Mogtader | 179/18 DA |
| 4,099,033 | 7/1978 | Murray | 179/90 D |
| 4,188,508 | 2/1980 | Rogers et al. | 179/18 DA |
| 4,234,764 | 11/1980 | Beebe | 179/90 D |
| 4,251,692 | 2/1981 | Waldman | 179/18 DA |

FOREIGN PATENT DOCUMENTS

| | | | |
|---|---|---|---|
| 1124560 | 3/1962 | Fed. Rep. of Germany | 179/18 DA |
| 1814584 | 6/1970 | Fed. Rep. of Germany | 179/18 DA |
| 45-27168 | 9/1970 | Japan | 179/18 DA |

*Primary Examiner*—Thomas W. Brown
*Attorney, Agent, or Firm*—Leon Arthurs; Kenneth M. Garrett

[57] ABSTRACT

In a telephone restriction system having circuitry to interrupt the dialing sequence upon detection of a prohibited number, the improvement permitting the restriction system to be disabled by dialing an access code using a standard key set. An access code detector provides an output upon recognition of the access code; this output is used to disable the restriction system including the reset system normally associated therewith for a predetermined period of time to permit the central office line to be released and re-engaged so as to clear the access code therefrom.

12 Claims, 12 Drawing Figures

KEY SET TOLL RESTRICTOR

FIELD OF INVENTION

This invention relates to telephone instrumentation. It particularly relates to telephone call restriction systems for inhibiting telephone calls unless a programmable access code is used. Still more particularly, it relates to such systems wherein the access code may be entered by using standard telephones.

BACKGROUND OF INVENTION

It is frequently desirable to restrict the use of telephones, for example so as to avoid unauthorized toll charges. Apparatus for giving effect to this aim is known. Such apparatus in one form thereof includes counting means for counting the number of dial pulls. When these exceed a certain number, generally seven, simple logic means provides an output signal which serves to actuate line disconnect means. In another form to the apparatus, counting means is provided to count one or more dialed digits. Logic means is provided giving an output signal which serves to actuate line disconnect means when a dialed pulse or pulses correspond to predetermined prohibited numbers. Generally in this apparatus the prohibited numbers will comprise the numbers 0 or 1 as the first dialed digit, and 1 as the second dialed digit; the third digit may also comprise a prohibited number. In a variation of this form of apparatus, logic circuitry is programmed to accept specific numbers, generally three digit numbers indicative of local exchanges, and deny all others. Each of the above described forms of the apparatus may be considered to comprise input circuitry for receiving signals representing dialed digits, detector circuitry to recognize prohibited digits, and blocking circuitry responsive to the ddetector circuitry to restrict the communication.

In many commercial organizations where it is desirable to use a restriction system it may be desirable or even necessary to overcome or disable the system so that selected personnel are able to have complete and unrestricted access to any exchange and number they require. This has been recognized in the past. U. S. Pat. No. 3,873,781—NISSIM, dated Mar. 25, 1975 describes an arrangement where the hand set remains in the cradle while an "access" code is dialed to overcome the restriction. This required a special dial mechanism or switching mechanism at the telephone set. A somewhat similar solution is described in U.S. Pat. No. 4,099,033—MURRAY, dated July 4, 1978 where unauthorized use of a telephone is ensured by a restrictive system where authorized users are provided with a code to be dialed in on a special telephone set or on separate equipment attached to the telephone set. Again, there must be special equipment at the set. Other ways of providing access of unlimited dialing privileges (i.e. unrestricted calling privileges) to authorized users are by means of a coded card inserted into an accessory at the telephone set as described in U.S. Pat. No. 4,045,619—HARRINGTON, dated Aug. 30, 1977, and by means of a precise tone generator applied to the telephone mouth piece as described in U.S. Pat. No. 4,096,357—MOGTADER, dated June 20, 1978. All these require modified or auxiliary equipment at the telephone set.

It is therefore an object of this invention to provide a telephone restriction system having means for overcoming or disabling the restriction in response to an access code dialed into a standard telephone set in the system.

It is another object of the invention to provide a new and improved telephone restriction system that can be disabled using an access code.

It is yet another object of the invention to provide a telephone restriction system with means for disabling the restriction using a programmable access code at a standard telephone set.

SUMMARY OF THE INVENTION

In accordance with the invention a telephone restriction system recognizes certain digits or combinations of digits in a telephone number dialed or otherwise entered by the user which are prohibited. The restriction system will block the attempted communication, for example, by opening the circuit to the central office upon recognition of the prohibited digits. An authorized user overcomes the restiction by dialing an access code to disable the restriction system, and the system is retained in the disabled condition for a time to permit the code number to be cleared from the central office.

Briefly, a telephone call restrictor according to one aspect of the invention has input means including terminals for connecting the restrictor to telephone lines for receiving dial signals, resetting means responsive to a voltage change at the terminals and associated with the telephone lines changing between a seized and released condition for resetting the telephone call restrictor to a first condition. The restrictor also includes circuit means connected to receive the signals for recognizing digits, and inhibiting means which is responsive to the recognition of prohibited digits for inhibiting communication on the telephone lines. Means are also provided which are responsive to the recognition of an access code for disabling the inhibiting means and also the resetting means for a predetermined time period whereby the telephone line can be released and re-seized without the telephone call reverting to its first condition, i.e. so that the inhibiting means will remain disabled.

The predetermined time period may be a time period initiated by any suitable action which normally ensues when using the telephone, e.g. the initial seizure of the telephone line. Preferably it is initiated by hooking the telephone to release the line subsequent to recognition of the access code. In general when using present day switching equipment the line is released at the central office within about 100 ms of the phone being hooked, hence the predetermined period during which the reset system need be disabled may only be marginally greater than this on-hook period. In this manner the possibility of a second party seizing a line monitored by a disabled restrictor is greatly reduced.

In another aspect, the invention comprises a telephone call restrictor having an input impedence of at least 1 megohm.

In a further aspect, the invention comprises a telephone call restrictor which may be connected to the telephone lines solely by parallel connection whilst blocking the transmission of a prohibited "0" digit.

Other aspects and objects of my invention will become apparent from a consideration of the following description of a preferred embodiment thereof. Such description is exemplary only, and is not to be taken as limiting the scope of the invention.

DESCRIPTION OF THE PREFERRED EMBODIMENT

Figure 1A:
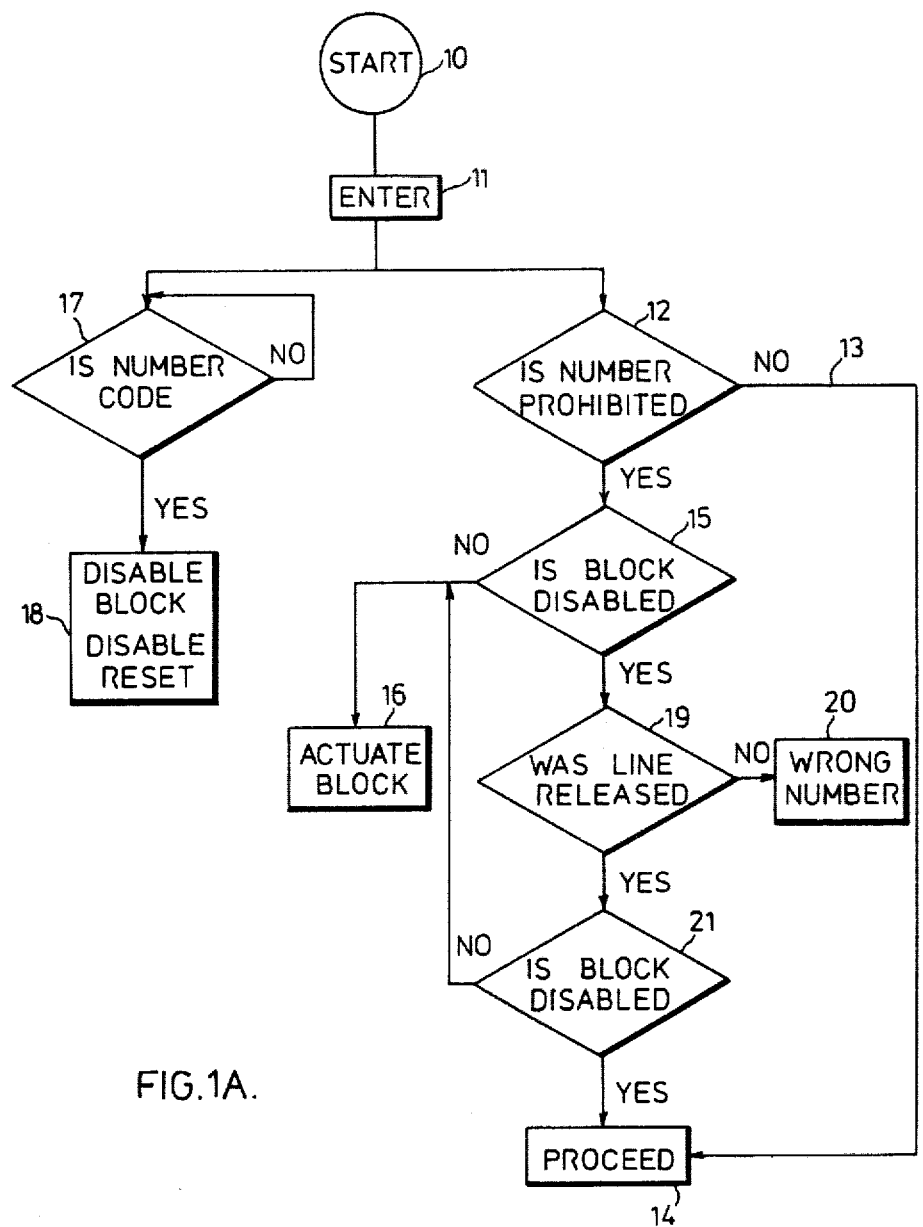
FIG. 1A is a flow diagram useful in explaining the invention.

FIG. 1A is a flow diagram illustrating generally the operating functions or steps in the telephone restriction system according to the invention. When a person using the telephone lifts the handset to seize control of the line the system is activated as represented by the start symbol 10. The system is ready to monitor dial signals which are available at the enter symbol 11. If the dialing begins immediately the dial signals are monitored as represented by decision symbol 12 to determine if the number is prohibited. Prohibited numbers could, for example, be an initial "1" indicating a direct dial long distance call, an initial "0" indicating perhaps a long distance operator placed call, and perhaps a second digit "1" indicating dialed numbers such as "411". In one form of the system it is also possible to include all exchanges other than those which are specifically permitted. If the monitored dial signals are not for a prohibited number, then the dial signals are permitted to continue as indicated by line 13 and proceed symbol 14. If the monitored dial signals are for a prohibited number, then a further decision symbol 15 determines the status of a dialing block, as will be explained subsequently. If it has not been disabled then a dialing block 16 is actuated which, for example, releases the line or otherwise blocks the attempted communication. On the other hand, if the dialing block has been disabled, the dialing can proceed as indicated.

There is provision for an authorized person having knowledge of a predetermined access code to disable the dialing block. Decision circuit 17 monitors the dial signals. If, when decision 17 is monitoring dial signals, it recognizes a predetermined code number (preferably a multi digit number which will differ from local exchange numbers), it disables the dialing block and reset as indicated by disable block and disable reset symbol 18, and will continue to disable it, or hold it disabled, for a predetermined time. Within this time the line must be released, as indicated by symbol 19, failing which continued dialing with result in a wrong number being received in the central office at 20. If the line was released, it must have been reseized within the predetermined time within which the block will remain disabled, as indicated at symbol 21. If yes, the call may proceed at 14, if no, the block becomes actuated at 16 to restrict the call.

Figure 1B:
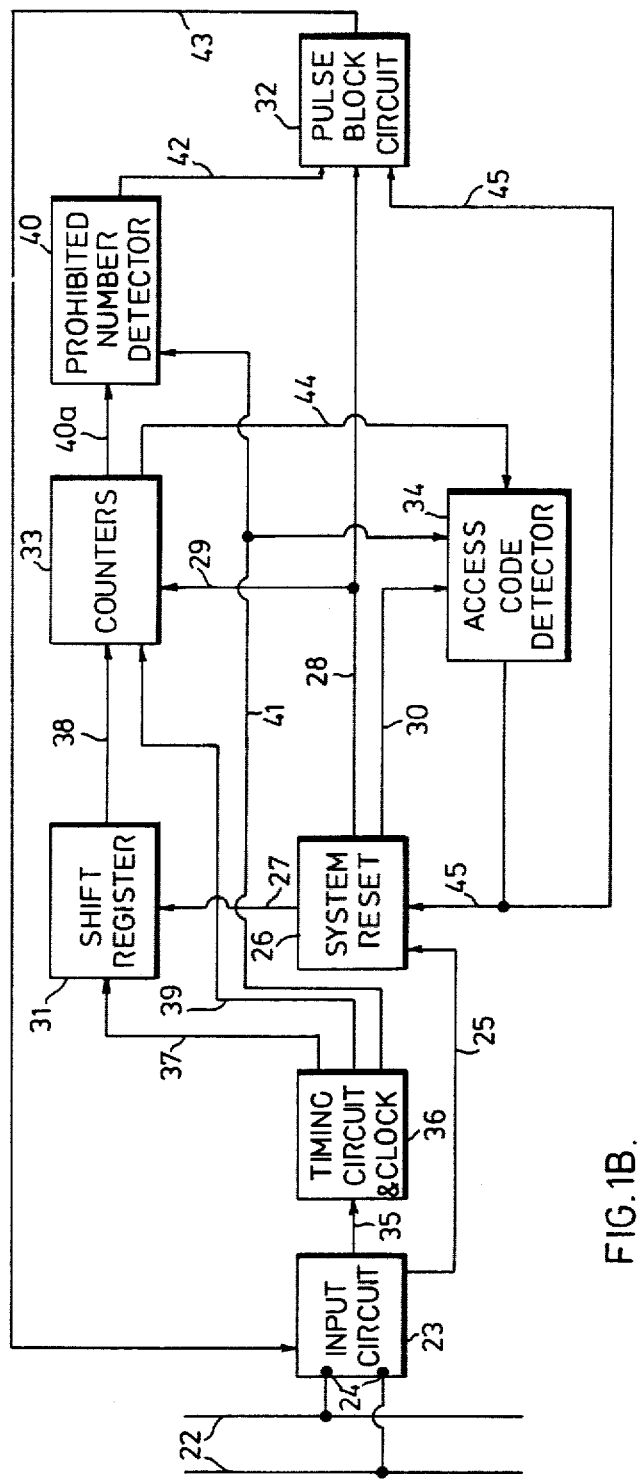
FIG. 1B is a block diagram of an embodiment of the invention.

Referring now to FIG. 1B, there is shown a simplified block circuit diagram of one form of the invention. The telephone line connecting between a telephone set and the central office is identified by the number 22, one line being the "tip", the other the "ring" line. Line 22 connects to an input circuit 23 at terminals 24. The input circuit 23 is responsive to the voltage on line 22, and provides an output signal on conductor 25 to reset system 26 used as a master reset signal for holding the call restrictor in a reset condition when the voltage is the on-hook voltage of about 50 volts. When the voltage drops to the off-hook voltage in the range of about 5 to 20 volts no signal is impressed on conductor 25. Master reset signal from system reset 26 is disseminated on conductors 27, 28, 29 and 30 respectively to shift register 31, pulse block circuit 32, counters 33 and code detector 34.

Input circuit 23 provides pulse output on conductor 35 to timing circuit and clock 36 representing the dialed signal input at terminals 24. Timing circuit and clock 36 provides a pulse on conductor 37 to shift register 31 causing this to shift a position and provide an output on conductor 38 to enable the first digit counter in counters 33 to count pulses input on line 39. The number of counters in counters 33 will generally depend upon the number of digits desired to be counted and analyzed. Most prohibited numbers comprise the number "0" or "1" dialed as a first or second digit. For access code purposes, three digit counters may be preferred as offering a wide range of code selections which differentiate from local exchange numbers.

As each digit is dialed, the timing circuit and clock 36 provides the requisite shift pulse and clock pulse to enable the correct counter. A prohibited number detector 40 connects to selected output terminals of counters 33 by conductors 40a. An output signal received on conductors 40a is gated by a master clock pulse from timing circuit and clock unit 36 on conductor 41, and is output on conductor 42 to activate pulse block circuit 32. The pulse block circuit provides an output signal on conductor 43 which activates switch contacts in input unit 23 to frustrate further communication with the central office.

Predetermined output terminals of counters 33 also connect to code detector 34 on conductors 44. An output signal received on conductors 44 and duly gated by a master clock signal received on conductor 41 will be output from the code detector on conductor 45 to pulse block circuit 32, thereby disabling the pulse block circuit, in effect holding it off until the signal is cancelled. Conductor 45 also connects to reset system 26 and provides a signal to reset the shift register 31, in effect cancelling the signal on conductor 44. Code detector 34 includes a switch means and the output signal on conductor 45 will remain until the switch means is reset by a reset signal received on conductor 30.

If it be assumed that the code access signal has been dialed so as to disable the pulse block circuit as described above, the same access signal will have been received by the central office and acted on there. In order to clear the signal from the central office line 22 must be released, for example by hooking the telephone. The voltage on line 22 will increase to the normal hook voltage to produce a reset signal on conductor 25. A time delay means is provided in conductor 30 to delay the resetting of the switch means of code detector 34.

Provided line 22 is re-seized before the time delay is exceeded, the output signal from code detector 34 will not be cancelled and the telephone call restrictor will remain disabled. A prohibited number may now be dialed, but it will not be acted upon as the disabling signal on conductor 45 pre-empts and over-rides any inhibit signal that might be received on conductor 42.

It will be appreciated that the output signal of code detector 34 may be used to disable the telephone call restrictor in any convenient manner so as to over-ride an inhibit signal, or to prevent the recognition thereof when input at terminals 24, and that the embodiment described is illustrative of one convenient manner only.

Lines 22 are indicated as being connected to terminals 24 by a parallel circuit connection, and such connection is generally preferred where the input signals received at the terminals are pulse signals. In that instance the signal on line 43 from the pulse block circuit acts to close switch contacts to connect a shunt resistance across terminals 24, as is generally known in the art. Where the signals received at terminals 24 are tone signals, the switch contacts will locate serially in one of lines 22, and open upon receipt of an inhibit signal.

If the restriction system is to be used with a tone dial telephone system, it is necessary to include a tone dial decoder which recognizes the seven tones and converts them to decimal numbers. Such decoders are known and would, in FIG. 1B, be connected to operate the shift register 31 and provide the decimal number to the appropriate counter. Thus, the restriction system can be made to function when the telephone sets are pulse dial sets or tone dial sets. The digits for a desired telephone number or code number entered by the telephone user will be recognized and acted on.

While it is believed that the preceding description will provide a satisfactory understanding of the invention, a specific circuit will be described briefly by way of example. This will ensure a very complete description.

INPUT CIRCUIT AND PULSE DETECTOR: FIG. 2

The input circuit comprises terminals 2-1 corresponding to terminals 24 of FIG. 1B for connecting the telephone call restrictor across tip and ring telephone lines. A rectifier bridge 2-2 connects to terminals 2-1 for polarity control. The output of bridge 2-1 connects to the ends of a high impedance voltage divider network formed by resistor 2-3, 2-4 and 2-5 having values of about 5, 1 and 5 megohms respectively. The restrictor system voltage of about 6 volts connects to the junction of resistor 2-4, 2-5. When a dial pulse is received at terminals 2-1 the voltage at the terminals will change from the off-hook voltage, in the range of about 5–20 volts to the on-hook voltage of about 50 volts. The corresponding voltage pulse measured at the junction of resistors 2-3, 2-4 will be inverted relative to the input pulse, and will go from a high of about 5.5 volts to a low of about 0.5 volts. This inverted voltage pulse is applied to the input of a CMOS Schmitt trigger NAND gate 2-6 and is adequate to provide a reliable pulse output therefrom at A, B and Z without interference of the transmission of dial pulses to the central office.

A load resistor 2-7 having switch contacts 2-8 serially connected therewith connects across the output of bridge 2-2. Resistor 2-7 has a value such as to prevent the transmission of dial pulses to the central office to frustrate communication therewith when switch contacts 2-8 are closed. With the contacts closed, the restrictor may be referred to generally as being in the on load condition.

TIMING CIRCUIT AND CLOCK: FIG. 3

Figure 2:
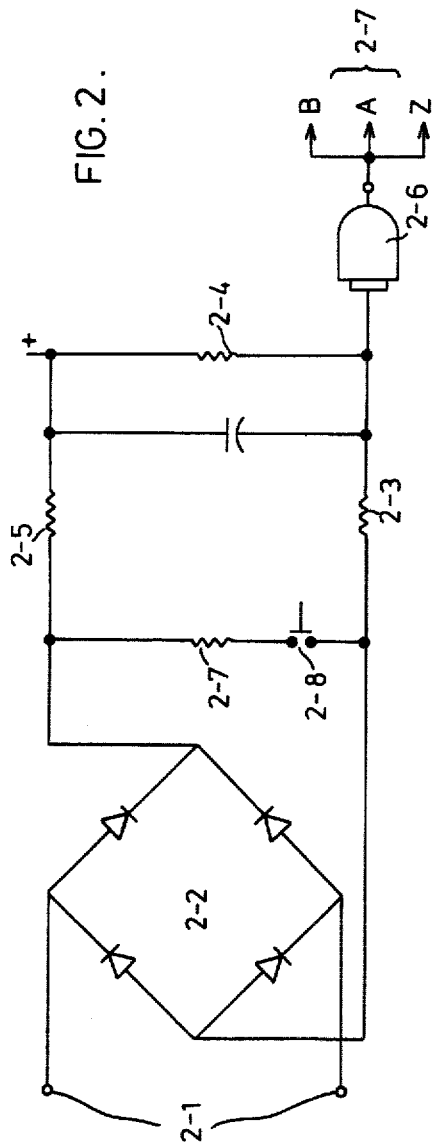
FIG. 2 is a circuit diagram showing details of the input and pulse detector and a load resistance.
Figure 5:
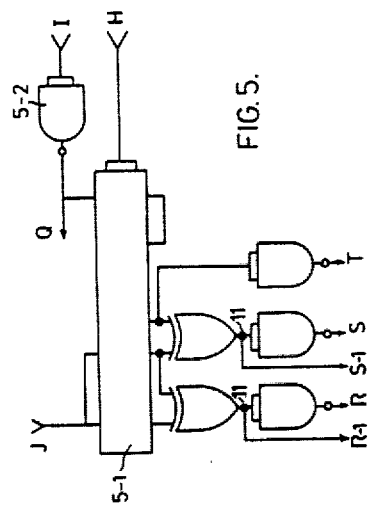
FIG. 5 is a circuit diagram showing the shifter unit.
Figure 6:
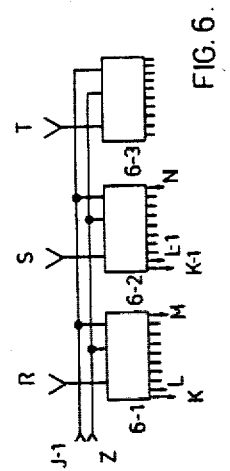
FIG. 6 is a circuit diagram showing the counters.

The pulse output A from the pulse detector of FIG. 2 is inverted at NAND gate 3-1 and applied to the setting input of timer switch 3-2. The output from gate 3-1 is also delayed by a pulse width at R-C delay circuit 3-3, inverted at NAND gate 3-4 and applied to the resetting input of the timer switch. The output of time switch 3-2 is inverted at NAND gate 3-5 to provide a master clock pulse output at G used for gating the output of counters (FIG. 6). The output of timer switch 3-2 connects directly to output H, used for gating the shift register (FIG. 5).

RESET: FIG. 4

The output B from pulse detector 2-6 connects to delay circuit 4-1 having a delay period of about 200 ms. When a high signal is outputted at B for a time exceeding this period, which condition will obtain when the line is released for at least 200 ms, an ongoing high will be inputted to NAND gate 4-2 to turn timer switch 4-3 on to provide a high output at I, J, J-1 and J-2 used as a master reset for the restrictor. Other resetting input signals used for partially resetting the restrictor as will be described are received at X and P, and coupled at OR gates 4-4, 4-5 and outputted at master reset I.

SHIFTER AND COUNTERS: FIGS. 5 & 6

The shifter and counter units are generally of a conventional nature and it is not believed necessary to describe them in detail. Pulse input Z, clock input H and resetting inputs I, J and J-1 have been described in relation to earlier Figures. For reference purposes the shifter is denoted as 5-1, and decade counters for counting the first three dialed digits as 6-1, 6-2 and 6-3. Shifter outputs R, S and T connect to and gate decade counters 6-1, 6-2 and 6-3 respectively. The remaining outputs R-1 and S-1 of shifter 5-1 will be described more particularly later in relation to the units controlled by them.

PULSE BLOCK SWITCH: FIG. 9

This unit is next described for an easier understanding of the operation and organization of this embodiment of the telephone restrictor as a whole. The unit comprises a timer switch 9-1 having a setting input at Y, a resetting input at Q and an output at OP.

A relay 9-2 connects to output OP the relay controlling switch contacts 2-8 to switch load 2-7 ON and OFF. Since the condition of the load determines whether or not dial pulses will be blocked, i.e. precluded from being transmitted to the central office, the instant unit may be referred to generally as a pulse block switch.

The output OP of timer switch 9-1, and thus the load condition, relates to the setting and resetting input signals of the timer switch as follows:

TABLE 1

| Conditioning of timer switch 9-1 | | | | |
|---|---|---|---|---|
| Y | 0 | 0 | 1 | 1 |
| Q | 0 | 1 | 0 | 1 |
|   |   |   |   | 0 |
| OP | 0 | 1 | 0 | or 1 → 0 |
|   |   |   |   | OFF or |

TABLE 1-continued

| Conditioning of timer switch 9-1 | | | |
|---|---|---|---|
| Load | OFF | ON | OFF | ON → OFF |

The output OP when the setting or resetting signals change in accordance with any of the conditions of the first three columns of Table 1 is substantially instantaneous with a changed input. When the condition of column 2 changes to that of column 4, i.e. when Q=1, and Y changes from 0 to 1, the output P remains high for a delay period of several seconds before going low. When the condition of column 3 changes to that of column 4, the output P will remain low.

The signals received at Y are inputted at W and XX where they are combined at OR gate 9-3, and inverted at NAND gate 9-4. A high, or inhibiting signal, received at W or XX will thus turn the load ON to inhibit pulse communication whenever a high signal is input at Q. A low or reset signal at Q will turn or maintain the load OFF and disable the pulse block.

The normal condition of timer switch 9-1 on application of a master reset signal to the restrictor is as shown in column 3.

PROHIBITED NO. DETECTOR: FIGS. 8A, 8B

Figure 3:
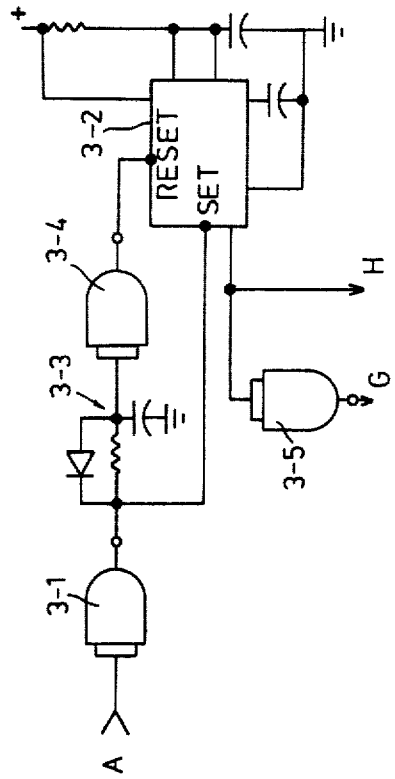
FIG. 3 is a circuit diagram showing the timing circuit and clock.
Figure 4:
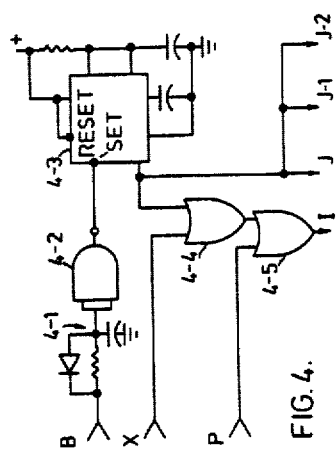
FIG. 4 is a circuit diagram showing the reset system.
Figure 7:
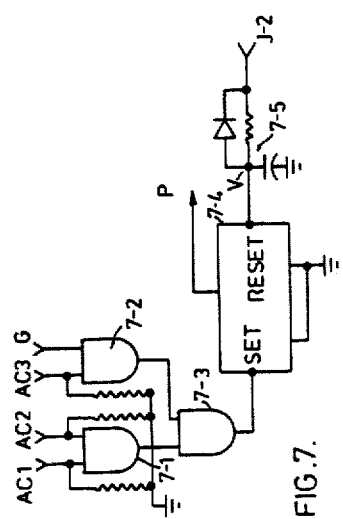
FIG. 7 is a circuit diagram showing the access code detector.
Figure 9:
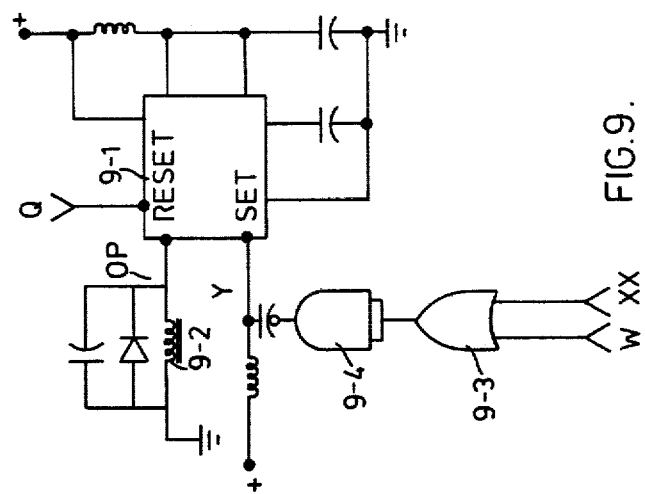
FIG. 9 is a circuit diagram showing the pulse block switch unit.
Figure 8B:
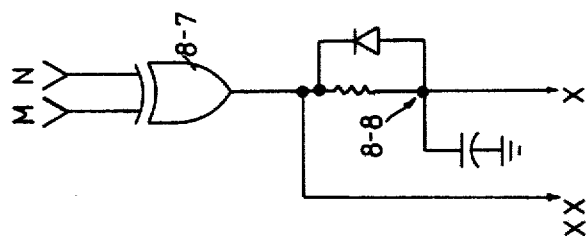
FIGS. 8A, 8B are circuit diagrams showing the prohibited number detector.
Figure 8A:
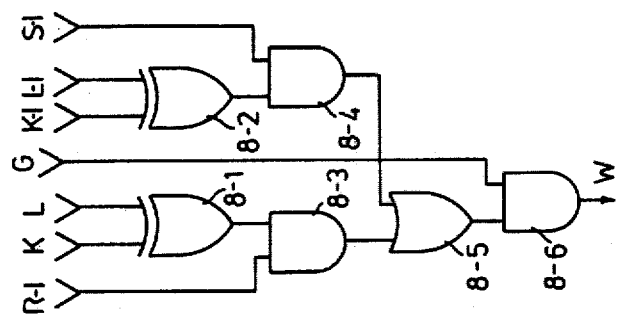
Figure 10:
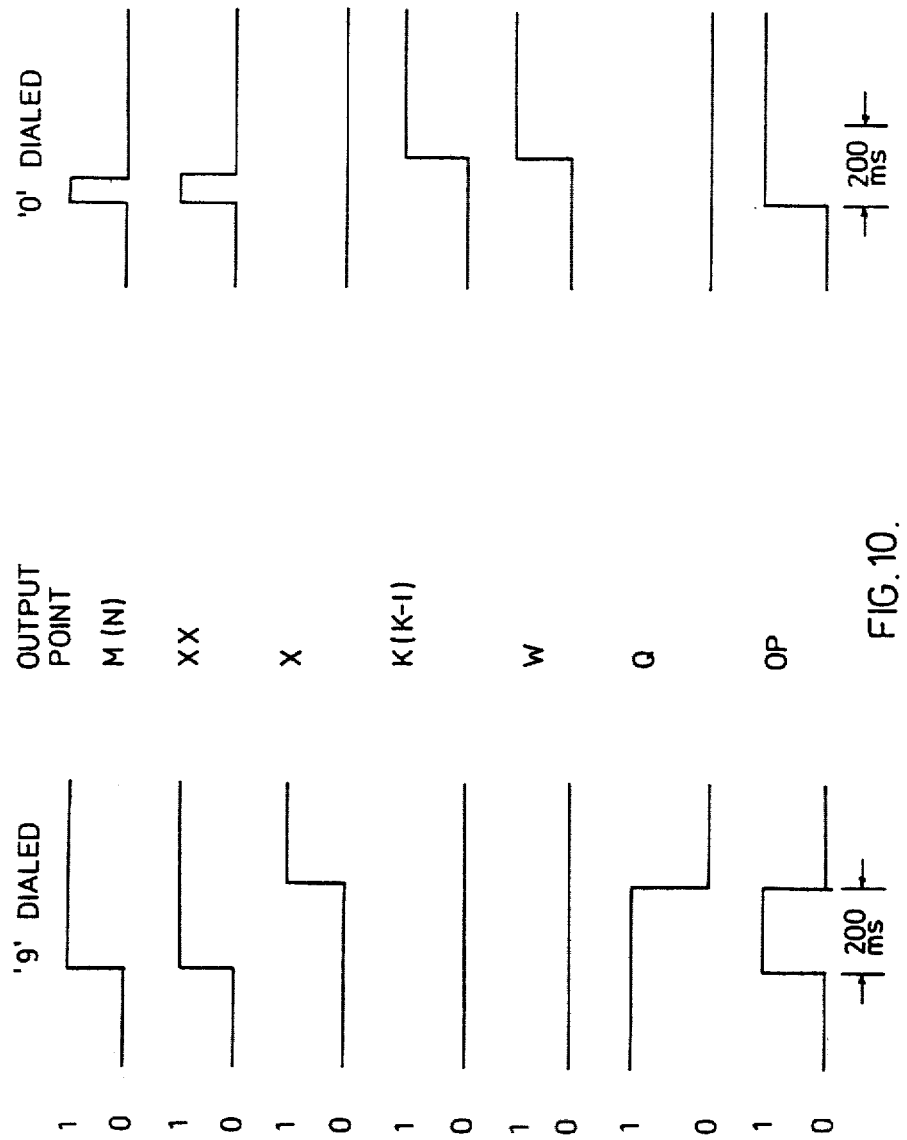
FIG. 10 shows in detail outputs in connection with the detection of prohibited digits.

A detector for the numbers "0" or "1" dialed as a first or second digit is generally of a conventional nature as seen in FIG. 8A. This comprises inputs K, L and K-1, L-1 strapped to the "0" and "1" output terminals of counters 6-1 and 6-2, the inputs being combined at exclusive OR gates 8-1, 8-2. The outputs of these gates are inputted to AND gates 8-3, 8-4, which are respectively enabled by a signal received at R-1, S-1 from shifter 5-1. After combination at OR gate 8-5, the signal is gated at AND gate 8-6 where it is enabled by a master clock signal received at G outputted from timer and clock unit (FIG. 3). A high outputted by either "0" pin or "1" pin of the first or second digit counters will when properly enabled produce a high at W to turn the load ON. It will be appreciated that this output could, in accordance with known practice, be used to curtail or otherwise frustrate communication with the central office by means other than blocking the signals with load resistance 2-7, for example by locating switch contacts 2-8 serially in the tip or ring line, in which instance the switch contacts would be normally closed. It will also be appreciated that other forms of prohibited number detectors may be used for generating an output signal comparable to that outputted at W upon detection of a prohibited number.

Where a load resistance is employed for restricting communication with the central office it will be recognized that whilst pulse transmission is restricted, voice transmission will not be, hence it is essential to block pulse transmission before a voice transmission circuit is established. Such circuit may be established upon receipt by the central office of 10 pulses of the digit "0" when dialed as a first or second digit, hence it is essential to inhibit the complete transmission of these pulses. It is also required to permit the nine pulses of the number "9" to be transmitted if dialed as a first or second digit, as this is not normally a prohibited number. Effectively, in order to inhibit the transmission of a prohibited "0" signal to the central office the last pulse thereof must be blocked. Referring to FIG. 9B, inputs M and N of exclusive OR gate 8-7 are strapped to the "9" digit output terminals of the first and second digit counters 6-1, 6-2 to provide an immediate high signal at XX when M or N is high. The output at X is delayed by R-C delay circuit 8-8 for a period of at least one pulse width, and preferably about 200 ms. When the number "9" is dialed as a first or second digit, the output at XX will go high immediately upon receipt of the ninth pulse at the relevant counter and the output at X will go high after the delay period. Output XX connects to the setting input of timer 9-1 at Y after inversion at gate 9-3. These output signals and others to be referred to in the ensuing description are shown in FIG. 10. Output X connects to the reset line (FIG. 4) and is outputted therefrom unchanged at I, inverted at NAND gate 5-2, and applied to shifter 5-1 to cancel the output at M or N, and at Q to reset timer switch 9-1. The load will thus have been turned ON for the duration of the delay period of delay circuit 8-8, and will not have interfered with the transmission of the 9 pulses of the digit.

Assuming now the number "0" to be dialed as a first or second digit, the "9" pin of the relevant counter will go high for one pulse width, to give a high of this duration at XX, and so turn the load ON. No output signal will be experienced at X, as the duration of the pulse input at M or N does not exceed the delay period of delay circuit 8-8. It will be appreciated that when XX goes low, the timer switch will remain ON for a period as previously described. A high output will be experienced at W within 1 pulse width of the signal at XX going low as the tenth pulse of the "0" is received at K or K-1, which will be applied at the setting input Y of timer 9-1 before the timer turns OFF, hence the load will be maintained ON and the tenth pulse of the "0" will not have been transmitted to the central office.

ACCESS CODE DETECTOR: FIG. 7

The access code detector comprises a pair of AND gates 7-1, 7-2 with inputs AC1, AC2, AC3 which are strapped to predetermined output terminals of counters 6-1, 6-2 and 6-3 to form a coded input to the code detector. Gate 7-2 is enabled by a master clock input at G. The outputs of gates 7-1, 7-2 are combined at AND gate 7-3, the output of which connects to the setting input of flip flop 7-4. A high signal will be input at each of terminals AC1, AC2, AC3 upon receipt by the telephone call restrictor of the access code, which may be entered by an unmodified telephone set, and assuming a proper clock signal at G, a high signal will be output at P of flip flop 7-4. P connects to the reset system (FIG. 4) and the high signal is output at I thereof unchanged, inverted at NAND gate 5-2 and applied to shifter 5-1 and timer switch 9-1 as previously described in relation to the prohibited number detector to hold the timer switch OFF.

It will be appreciated that the access code signal received by the telephone call restrictor will have also been received in the central office. In order to complete a telephone call, the access code signal must be cleared from the central office. This is done by releasing the line, by hooking the telephone momentarily. Referring back to FIGS. 2 and 4, release of the line will generate a high output signal at B for the period for which the line is released. The high output at B is delayed by delay circuit 4-1 as earlier described, inverted at gate 4-2 and outputted from switch 4-3 as a high master reset signal at I, J and J-1 to reset the shifter 5-1 and counters 6-1, 6-2, 6-3. The master reset signal is also output at J-2, and is received as an input to RC time delay circuit 7-5. The delay period of this circuit is about 400 ms. A high signal outputted therefrom at V will reset flip flop 7-4 whereby the output at P would go low. Provided the line is released for less than the combined delay periods of delay circuits 4-1 and 7-5, the master reset signal will be blocked by delay circuit 7-5 whereby the output at V will remain low, and that at P will remain high, so that the timer switch 9-1 will remain reset in the OFF condition irrespective of the setting input. Any subsequent inhibiting signal outputted at W from the prohibited number detector (FIG. 8A) will therefore not inhibit the telephone call.

Whilst the embodiment has been particularly described with reference to a pulse input at terminals 2-1, it will be apparent that the invention has applicability to a tone input. In that circumstance, switch contacts 2-8 would be normally closed and serially connected with one of the lines connecting to the central office and timer switch 9-2 would act so as to open the switch contacts so as to restrict all communication with the central office on recognition of a prohibited number as earlier described. A tone to pulse converter unit such as is generally known in the art may be employed for generating pulse signals corresponding to the tone input for detection as described, or still other circuitry may be employed to accomplish the aims of the invention. The scope of the invention is not therefore limited by the particular embodiment described, the invention being defined in the claims appended hereto.

I claim:

1. A telephone call restrictor comprising:
   input means including terminals for connecting said telephone call restrictor to a telephone line for receiving dial signals;
   resetting means responsive to a voltage change to said terminals associated with said telephone line changing between a seized and a released condition for resetting said telephone call restrictor to a first condition;
   circuit means connected to receive said signals for recognizing digits;
   inhibiting means responsive to the recognition of prohibited digits for inhibiting communication on said telephone line; and
   means responsive to the recognition of an access code for disabling said inhibiting means and said resetting means for a predetermined time period,
   whereby said telephone line may be released and reseized without said telephone call restrictor reverting to said first condition.

2. A telephone call restrictor as defined in claim 1 including circuit means for initiating said predetermined time period upon recognition of an on-hook voltage at said terminals.

3. A telephone call restrictor as defined in claim 2 wherein said circuit means provides a predetermined time period as aforesaid of less than 1 second.

4. A telephone call restrictor as defined in claim 1 adapted for a parallel connection to said telephone line wherein said inhibiting means includes a load and switch means for connecting said load across said terminals.

5. A telephone call restrictor as defined in claim 1 wherein said input means includes a high impedance voltage divider network whereby the impedance across said terminals is at least 1 megohm.

6. A telephone call restrictor comprising:
   connection means for connecting the restrictor to a telephone line;
   resetting means responsive to a voltage change at said connection means as said telephone line changes between a seized and a released condition for setting the restrictor to a condition to frustrate prohibited telephone calls;
   counter means connected to said connection means for receiving pulse signals and counting the pulses of digits dialed;
   prohibited number detection means connected to said counter means for recognizing a predetermined digit or combination of digits representing a prohibited number and providing at recognition an inhibit signal;
   switch means responsive to the receipt of an inhibit signal for inhibiting communcation on said telephone line; and
   code detection means connected to said counter means for recognizing a predetermined access code and providing at recognition a disabling signal to frustrate an inhibit signal and disable said resetting means for a predetermined time period;
   whereby said telephone line may be released and re-seized without resetting said telephone call restrictor to turn off said disabling signal.

7. A telephone call restrictor as defined in claim 6 wherein said switch means includes a time switch which latches on for a predetermined time period on receipt of an inhibit signal and in the absence of a reset signal.

8. A telephone call restrictor as defined in claim 7 wherein said counter means includes a '9' terminal providing a transient output signal and a steady output signal therefrom upon receipt of dial pulses at said connection means when the numbers '0' and '9' are respectively dialed at least as a first digit, and wherein said prohibited number detection means connects to said '9' terminal to provide a '9' inhibit signal of similar duration to the output signal at said '9' terminal, further including circuit means including a short delay means to provide a delay period greater than the period of said transient output to apply said '9' inhibit signal to reset said time switch when said '9' inhibit signal exceeds the duration of said short delay means.

9. A telephone call restrictor as defined in claim 8 wherein said short delay means provides a delay period of about 200 ms.

10. A telephone call restrictor as defined in claim 6 including circuit means for initiating said predetermined time period upon the voltage at said terminals changing from on-off hook voltage to an off-hook voltage.

11. A telephone call restrictor as defined in claim 10 wherein said predetermined time period is about 600 ms.

12. A telephone call restrictor as defined in claim 6 wherein said switch means acts to inhibit communication by connecting a load across said terminals.

* * * * *